(12) United States Patent
Brenin et al.

(10) Patent No.: US 11,557,402 B2
(45) Date of Patent: Jan. 17, 2023

(54) NUCLEAR REACTOR, GUIDE TUBE SUPPORT, AND CORRESPONDING MAINTENANCE METHOD

(71) Applicant: FRAMATOME, Courbevoie (FR)

(72) Inventors: Christian Brenin, Alleriot (FR); Denis Pollier, Champforgeuil (FR); Laurent Cahouet, Chaudenay (FR); Denis Cedat, Chatenoy le Royal (FR)

(73) Assignee: FRAMATOME, Courbevoie (FR)

( * ) Notice: Subject to any disclaimer, the term of this patent is extended or adjusted under 35 U.S.C. 154(b) by 0 days.

(21) Appl. No.: 17/045,086

(22) PCT Filed: Apr. 4, 2019

(86) PCT No.: PCT/EP2019/058487
§ 371 (c)(1),
(2) Date: Oct. 2, 2020

(87) PCT Pub. No.: WO2019/193088
PCT Pub. Date: Oct. 10, 2019

(65) Prior Publication Data
US 2021/0366624 A1 Nov. 25, 2021

(30) Foreign Application Priority Data
Apr. 5, 2018 (FR) ...................... 1852975

(51) Int. Cl.
*G21C 13/036* (2006.01)
*G21C 7/10* (2006.01)
(Continued)

(52) U.S. Cl.
CPC ............. *G21C 13/036* (2013.01); *G21C 7/10* (2013.01); *G21C 7/16* (2013.01); *G21C 19/20* (2013.01)

(58) Field of Classification Search
CPC .......... G21C 13/036; G21C 7/10; G21C 7/16; G21C 13/00; G21C 13/02; G21C 13/032;
(Continued)

(56) References Cited

U.S. PATENT DOCUMENTS

| 4,446,099 A | * | 5/1984 | Schwind | ................ G21C 17/00 976/DIG. 207 |
| 5,002,722 A | * | 3/1991 | Canat | ..................... G21C 3/322 376/443 |
| 5,053,189 A | | 10/1991 | Chrise | |

FOREIGN PATENT DOCUMENTS

| CN | 1918665 A | * | 2/2007 | ........... G21C 13/032 |
| FR | 2727560 A1 | | 5/1996 | |

OTHER PUBLICATIONS

Corresponding Search Report for PCT/EP2019/058487.
Corresponding Search Report for FR1852975.

* cited by examiner

*Primary Examiner* — Darlene M Ritchie
(74) *Attorney, Agent, or Firm* — Davidson, Davidson & Kappel, LLC

(57) ABSTRACT

A nuclear reactor includes guide tubes; and vessel head penetrations each comprising a tubular adapter fixed in one of the openings and defining an inner passage. Each vessel head penetration also includes a tubular sleeve engaged in the inner passage and axially extending in line with one of the guide tubes. Each sleeve is suspended by an upper axial sleeve end lying on an upper range on the corresponding adapter. A lower axial end of the sleeve projects axially into the vessel beyond the adapter and is separated from an upper axial end of the corresponding guide tube by an axial gap having an axial height of less than 50 millimeters.

13 Claims, 7 Drawing Sheets

(51) Int. Cl.
*G21C 7/16* (2006.01)
*G21C 19/20* (2006.01)

(58) Field of Classification Search
CPC . G21C 13/04; G21C 7/08; G21C 7/12; G21C 7/14; G21C 7/18; G21C 19/20; G21C 19/22; G21C 19/26; Y02E 30/30
USPC ............... 376/219, 226, 227, 242, 262, 353, 376/203–205, 235–236
See application file for complete search history.

NUCLEAR REACTOR, GUIDE TUBE SUPPORT, AND CORRESPONDING MAINTENANCE METHOD

The present disclosure relates in general to nuclear reactors with mechanisms for driving the members controlling the reactivity of the core located outside the vessel.

BACKGROUND

A nuclear reactor may include:
- a vessel having a substantially vertical central axis, the vessel including a vessel head having a plurality of openings;
- a core, positioned inside the vessel;
- guide tubes, positioned inside the vessel;
- a plurality of members controlling the reactivity of the core, axially movable inside the guide tubes;
- vessel head penetrations, each comprising a tubular adapter fixed in one of the openings and defining an inner passage, each vessel head penetration further comprising a tubular sleeve engaged in the inner passage and axially extending in line with one of the guide tubes;
- control rods, secured to control members and each extending through one of the sleeves;
- drive mechanisms of the control members, located outside the vessel, each mechanism being configured to drive one of the rods axially.

Each sleeve can be suspended by an upper axial sleeve end, which rests on an upper step arranged on the corresponding adapter.

Because each sleeve is free relative to the corresponding tubular adapter, wear of the tubular sleeve and/or the adapter can occur, due to the relative movement between these two elements.

SUMMARY

In this context, the present disclosure provides a nuclear reactor in which this wear phenomenon is better controlled.

To that end, according to a first aspect, a nuclear reactor is provided comprising:
- a vessel having a substantially vertical central axis, the vessel including a vessel head having a plurality of openings;
- a core, positioned inside the vessel;
- guide tubes, positioned inside the vessel;
- a plurality of members controlling the reactivity of the core, axially movable inside the guide tubes;
- vessel head penetrations, each comprising a tubular adapter fixed in one of the openings and defining an inner passage, each vessel head penetration further comprising a tubular sleeve engaged in the inner passage and axially extending in line with one of the guide tubes;
- control rods, secured to control members and each extending through one of the sleeves;
- drive mechanisms of the control members, located outside the vessel, each mechanism being configured to drive one of the rods axially;
- each sleeve being suspended by an upper axial sleeve end resting on an upper step arranged on the corresponding adapter;
- a lower axial end of the sleeve projecting axially into the vessel beyond the adapter and being separated from an upper axial end of the corresponding guide tube by an axial gap having an axial height of less than 50 millimeters.

Because the sleeve is only suspended from the corresponding adapter, relative movements necessarily occur between the sleeve and the adapter, due to the circulation of the primary fluid inside the vessel. These relative movements lead to wear of the upper axial sleeve end and/or the upper step, such that the sleeve, after a certain length of time, descends axially toward the core.

Because the axial gap separating the upper axial end of the guide tube and the lower axial end of the sleeve is very small, the sleeve then rests by its lower axial end on the upper axial end of the guide tube.

The sleeve is then no longer suspended by its upper axial end, but on the contrary bears axially at both of its ends.

The relative movement between the sleeve and the adapter is drastically reduced, or even completely eliminated.

As a result, the wear of the sleeve and/or the adapter becomes extremely reduced, or is even completely stopped.

The lifetime of the vessel head penetration is considerably increased.

The nuclear reactor can also have one or more of the features below, considered individually or according to any technically possible combinations:
- the lower axial sleeve end is separated from the corresponding upper axial guide tube end by a radial gap with a radial width smaller than 20 millimeters;
- each lower axial sleeve end has a shape flared toward the guide tube, the upper axial guide tube end comprising an axially protruding part, engaged in the lower axial sleeve end, said axial gap being defined between an inner surface of the flared lower axial sleeve end and the protruding part;
- said radial gap is defined between the inner surface of the flared axial lower sleeve end and the protruding part;
- the lower axial sleeve end has a frustoconical shape, the protruding part having a frustoconical shape conjugated with that of the lower axial sleeve end;
- the upper axial guide tube end has a lower step, a free edge of the lower axial sleeve end being located axially above the lower step, said axial gap being defined between the free edge and the lower step;
- the lower step is defined by a plurality of closed-contour surfaces, separated from one another by passages, and distributed around the rod;
- the upper axial guide tube end includes at least one radial stop located radially toward the inside and/or toward the outside of the lower step, said radial gap being defined between the free edge and the at least one radial stop;
- each guide tube comprises a tubular guide structure and an end part fastened to the guide structure and defining the upper guide tube end;
- the end part has a central axial orifice passed through by the rod, and fluid circulation ducts emerging in the central axial orifice;
- the guide structure comprises an upper plate having a passage orifice for the rod placed to coincide with the central axial orifice, the end part being fastened to the upper plate, the upper plate and the end orifice having, perpendicular to the central axis, inner and/or outer sections that are substantially identical.

According to a second aspect, the present disclosure provides a method for maintaining a nuclear reactor, comprising:

a vessel having a substantially vertical central axis, the vessel including a vessel head having a plurality of openings;

a core, positioned inside the vessel;

guide tubes, positioned inside the vessel, each guide tube comprising a tubular guide structure;

a plurality of members controlling the reactivity of the core, axially movable inside the guide tubes;

vessel head penetrations, each comprising a tubular adapter fixed in one of the openings and defining an inner passage, each vessel head penetration further comprising a tubular sleeve engaged in the inner passage and axially extending in line with one of the guide tubes;

control rods, secured to control members and each extending through one of the sleeves;

drive mechanisms of the control members, located outside the vessel, each mechanism being configured to drive one of the rods axially;

each sleeve being suspended by an upper axial sleeve end resting on an upper step arranged on the corresponding adapter;

a lower axial end of the sleeve projecting axially into the vessel beyond the adapter and being located above the guide tube;

the method comprising at least the following step:
fastening an end part to the guide structure of at least one guide tube, the end part defining an upper axial guide tube end, the lower axial sleeve end being separated from the corresponding upper axial guide tube end by an axial gap with an axial height smaller than 50 millimeters.

The method may further have the feature below:

the lower axial sleeve end is separated from the corresponding upper axial guide tube end by a radial gap with a radial width smaller than 20 millimeters.

BRIEF DESCRIPTION OF THE DRAWINGS

Other features and advantages of the present disclosure will emerge from the detailed description thereof provided below, for information and non-limitingly, in reference to the appended figures, in which.

DETAILED DESCRIPTION

Figure 1:
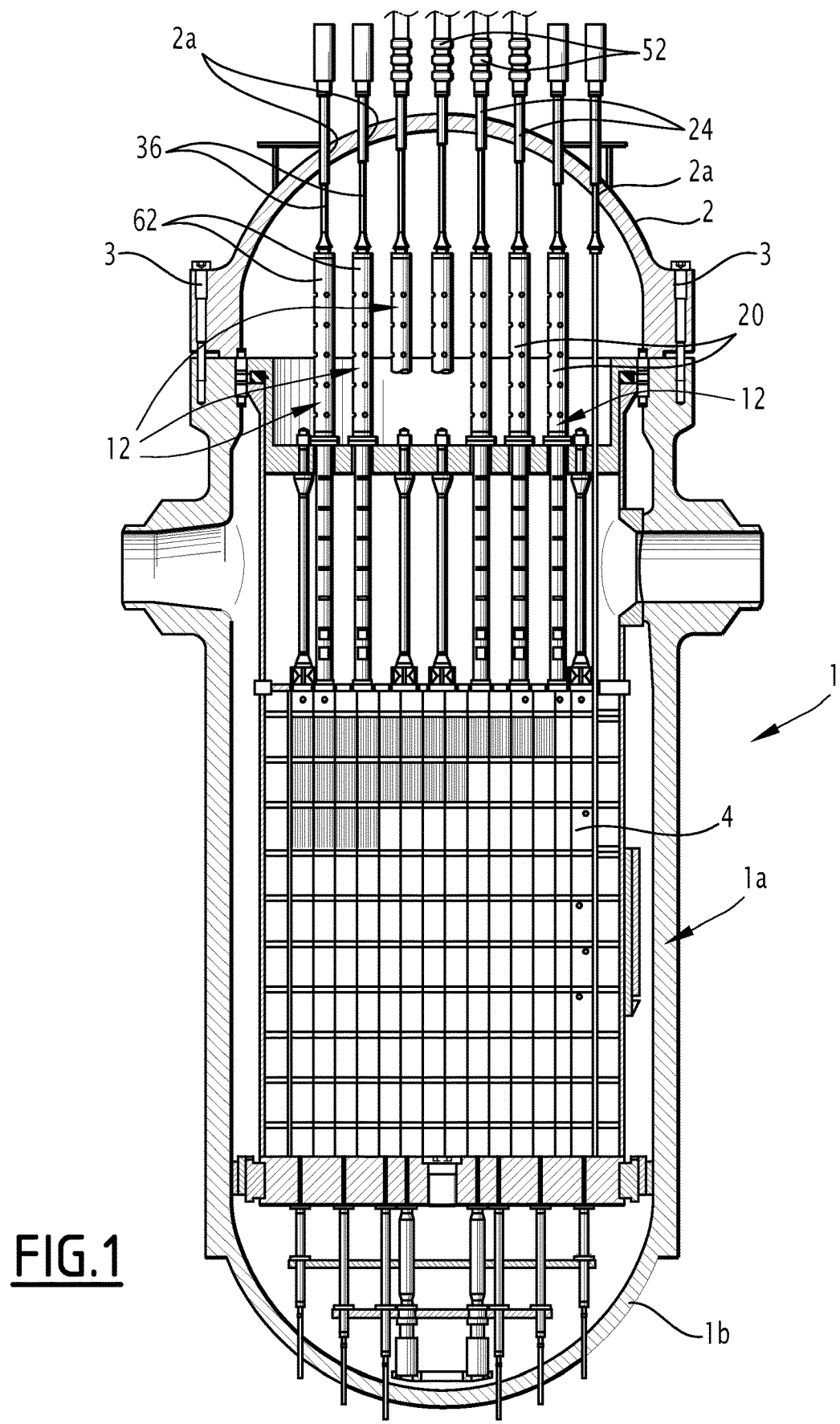
FIG. 1 is a sectional illustration of the vessel of a nuclear reactor, in a vertical plane.

The nuclear reactor illustrated in FIG. 1 is a reactor of the pressurized water reactor (PWR) type. In a variant, the reactor is of the boiling water reactor (BWR) type.

The nuclear reactor comprises a vessel 1, having a substantially vertical central axis.

The vessel 1 includes a substantially cylindrical shroud 1a, closed at its lower end by a substantially hemispherical domed bottom 1b. The shroud is open at its upper end.

The vessel also includes a vessel head 2, having a plurality of openings 2a.

The vessel head 2 substantially hemispherical and rests on a bearing step at the upper end of the shroud 1a. It is typically tightly fastened on the shroud 1a by locking pins 3.

The nuclear reactor also includes a core 4, positioned inside the vessel 1.

The core is made up of nuclear fuel assemblies, typically prismatic, positioned in a juxtaposed manner.

The nuclear reactor further includes guide tubes 12, positioned inside the vessel, and a plurality of members 14 controlling the reactivity of the core, axially movable inside the guide tubes 12.

Figure 2:
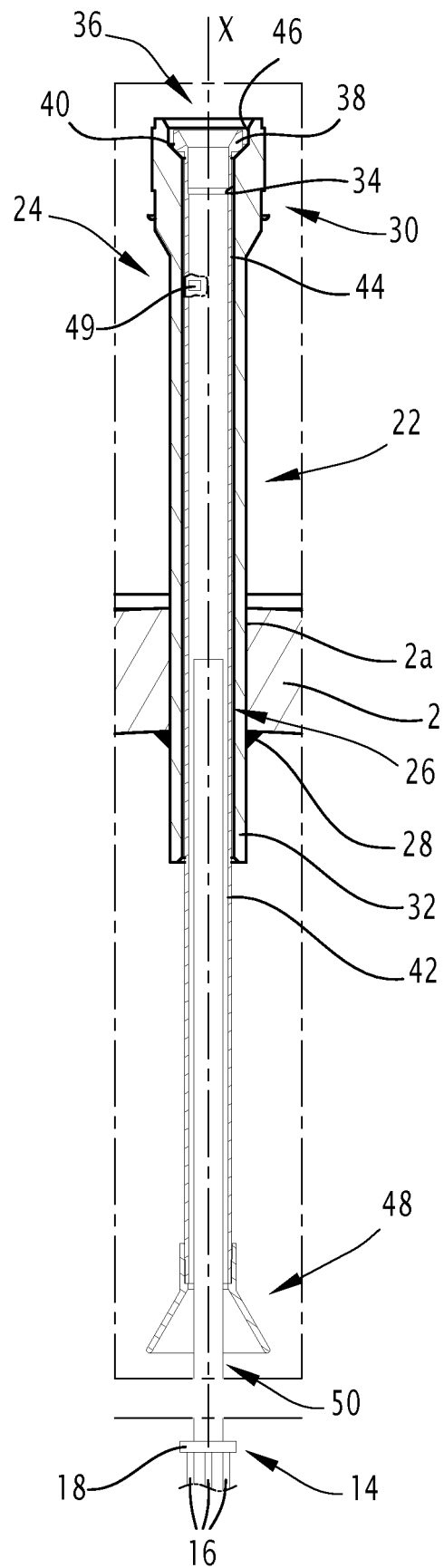
FIG. 2 is a sectional view, in a vertical plane, of a vessel head penetration of the nuclear reactor of FIG. 1.

The guide tubes are visible in FIG. 1, the upper part of the control members 14 being illustrated in FIG. 2.

The members controlling the reactivity of the core 14, also commonly called control clusters, typically comprise a bundle of elongated rods 16 containing a material absorbing the neutrons, suspended from a spider 18.

The guide tubes 12 are oriented vertically. They typically include guide frames in which the rods 16 slide, and a cylindrical outer cover 20. The rods 16 are engaged in the core over at least part of their length when the control members are in the low position, and are removed from the core when the control member is in the high position.

The nuclear reactor further includes vessel head penetrations 22 illustrated in detail in FIG. 2. Each vessel head penetration 22 comprises a tubular adapter 24 fastened in one of the openings 2a.

The adapter 24 typically includes a running part 26, the diameter of which corresponds to the inner diameter of the opening 2a, and which is typically first bound into the cover and next fixed by an annular weld bead 28 on the lower inner face of the vessel head 2.

The adapter 24 also includes a diametrically wider upper part 30, located outside and above the vessel head 2.

Furthermore, a lower part 32 of the adapter 24 projects relative to the inner lower surface of the vessel head 2.

The adapter 24 defines an inner passage 34. This passage typically has a vertical axis.

Each penetration 22 further comprises a tubular sleeve 36 engaged in the inner passage 34 and extending axially in the extension of one of the guide tubes 12, as illustrated in FIG. 1. Each sleeve 36 is suspended by an upper axial sleeve end 38, which rests on an upper step 40 arranged on the corresponding adapter 24 (see FIG. 2).

The sleeve 36 is typically coaxial to the adapter 24. It typically includes a substantially cylindrical central segment 42, with a substantially constant section over its whole height.

The upper axial end 38 has a wider outer section relative to the central segment 42 and constitutes an enlargement resting on the upper step 40.

The inner passage 34 has a running segment of substantially constant inner section, extending over nearly all of the height of the adapter, this section being slightly greater than the outer section of the central segment 42 of the sleeve such that a gap 44 exists between the central segment 42 of the sleeve and the wall of the inner passage 34.

The inner passage 34 has an upper end 46 of wider section. The upper step 40 constitutes a shoulder connecting the wider upper end 46 of the inner passage to the running segment.

The upper step 40 faces upward, the upper axial end 38 resting due to the weight of the sleeve on the upper step 40.

The lower axial end 48 of the sleeve projects into the vessel beyond the tubular adapter 24.

The sleeve 36 bears on an outer surface of the pads 49, which guarantee the separation between sleeve and the inner surface of the passage 34. The sleeve and the adapter are thus kept in a practically coaxial arrangement.

The nuclear reactor further includes control rods 50, secured to control members 14.

The spider 18 is rigidly fastened to a lower end of the control rod 50, as shown in FIG. 2.

Each rod 50 extends axially through one of the sleeves 36.

The nuclear reactor further includes drive mechanisms 52 of the control members 14, located outside the vessel 1. Each mechanisms 52 is configured to drive one of the rods 50 axially, and thus to move the corresponding control member 14.

The mechanisms 52 are mounted tightly on the upper parts 30 of the adapters.

According to the present disclosure, the lower axial end 48 of the sleeve 36 is separated from an upper axial end 54 of the corresponding guide tube 12 by an axial gap having an axial height of less than 50 millimeters.

Figure 3:
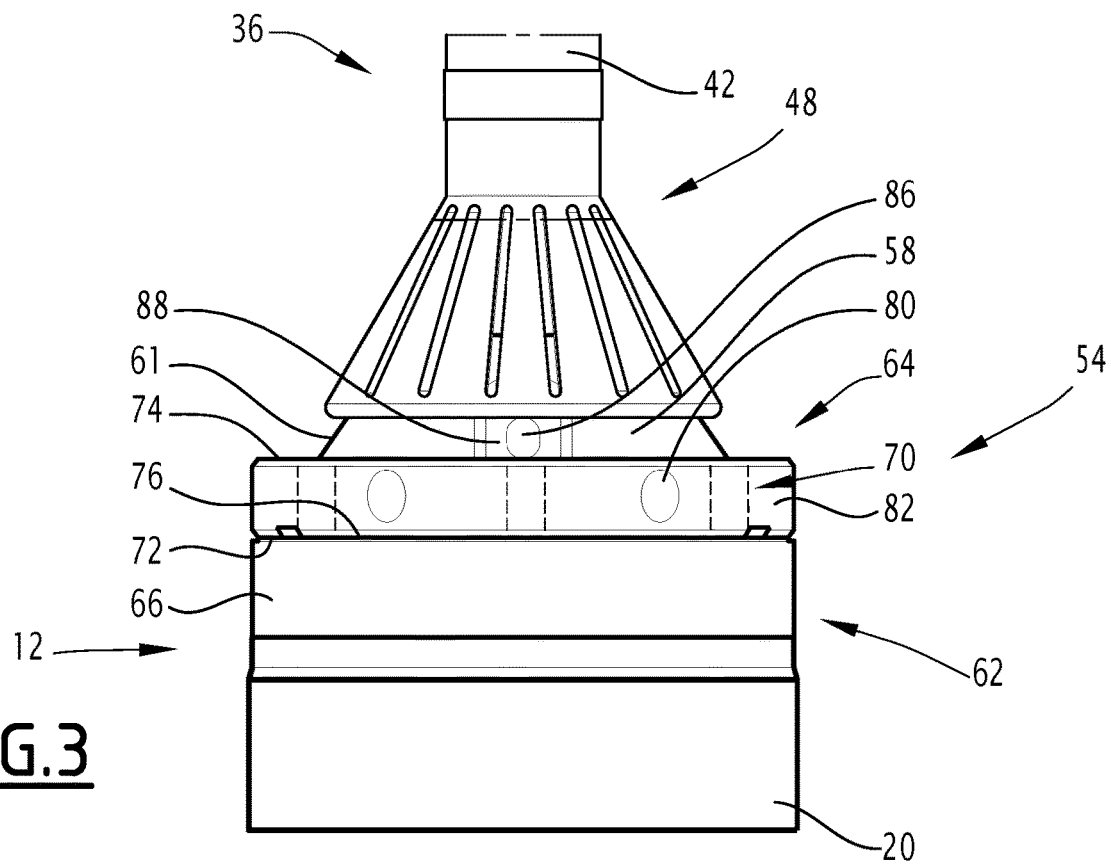
FIG. 3 is a side view of the lower axial end of the sleeve of FIG. 2, and the upper axial end of the corresponding guide tube for a nuclear reactor according to the present disclosure.
Figure 4:
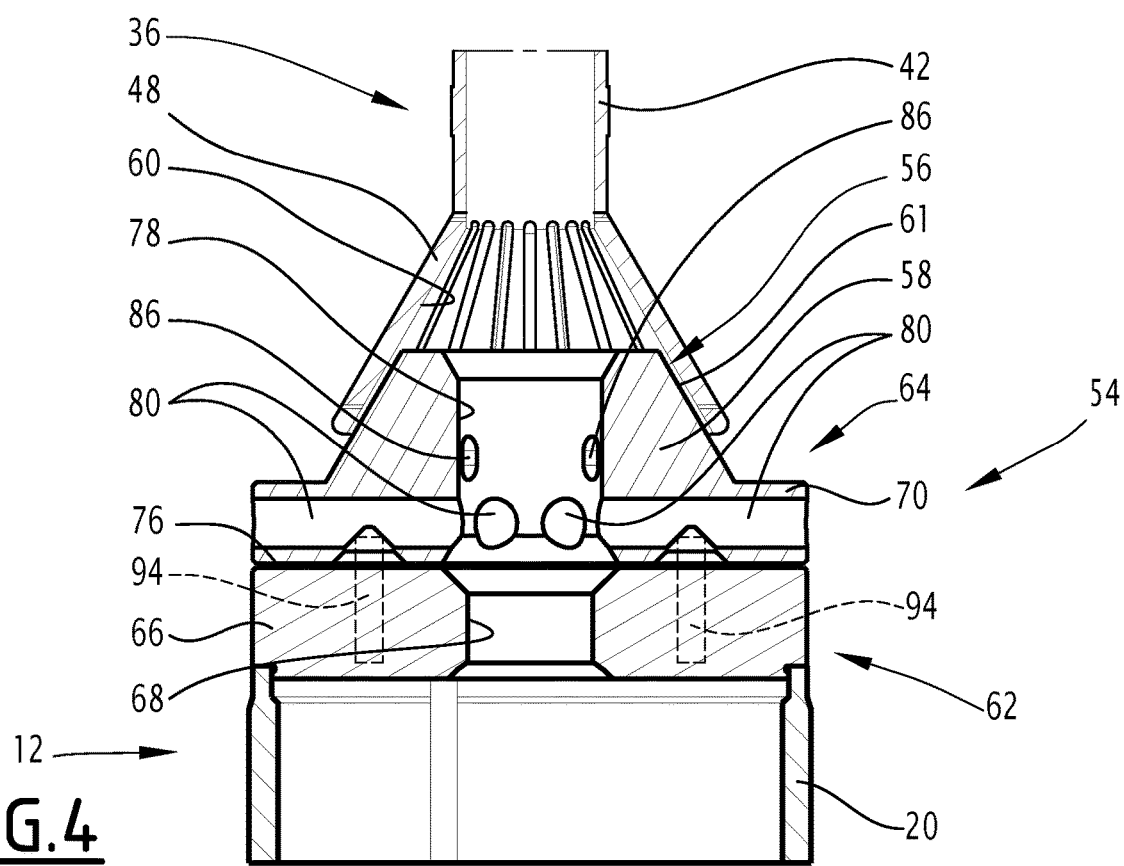
FIG. 4 is a sectional view in a vertical plane of the lower axial end of the sleeve of FIG. 2, and the upper axial end of the corresponding guide tube for a nuclear reactor according to the present disclosure.
Figure 5:
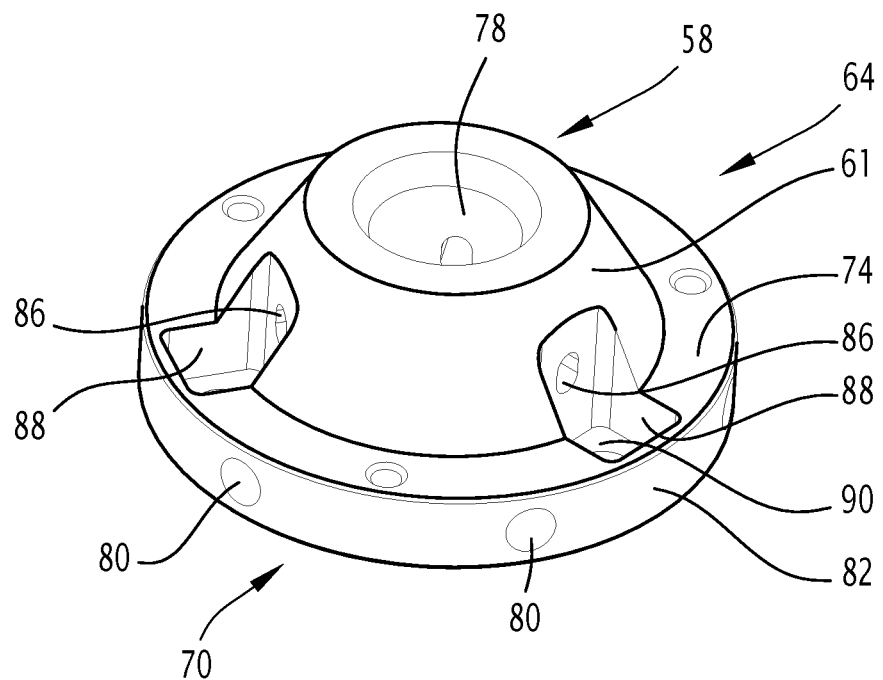
FIGS. 5 and 6 are perspective views, top and bottom, respectively, of the end part illustrated in FIGS. 3 and 4.

This situation is shown in FIGS. 3 and 4.

In other words, there is, between the lower sleeve end 48 and the upper axial guide tube end 54, a gap 56 whereof the height, taken along the central axis, is smaller than 50 millimeters. Preferably, this height is smaller than 30 millimeters and still more preferably smaller than 10 millimeters.

Thus, in case of relative movements between the upper sleeve end 38 and the upper step 40, which would cause wear of the upper step 40 of the upper sleeve end 38, the vertical level of the sleeve 36 would drop, and the lower axial sleeve end 48 would bear against the upper axial guide tube end 54. This would result in interrupting the wear of the upper step 40 or of the upper sleeve end 38.

Advantageously, the lower axial sleeve end 48 is separated from the corresponding upper axial guide tube end 54 by a radial gap with a width smaller than 20 millimeters. This radial gap preferably has a width smaller than 10 millimeters and still more preferably smaller than 5 millimeters.

For example, the width of the gap 56, visible in FIG. 4, taken radially, is smaller than the width stated above. This width is taken in a plane perpendicular to the central axis. It is taken along a radial direction relative to the axis X of the sleeve.

This results in limiting, or even completely eliminating any pendular movement of the sleeve around its upper bearing.

According to a first embodiment illustrated in FIGS. 3 to 6, the lower axial sleeve end 48 has a shape flared toward the guide tube 12, and the upper axial guide tube end 54 comprises a protruding part 58, engaged in the lower axial sleeve end 48.

As shown in FIG. 4, the gap 56 between the inner surface 60 of the lower axial sleeve end 48, and the outer surface 61 of the protruding part 58 corresponds to both the axial gap and the radial gap.

Typically, the lower axial sleeve end 48 has a frustoconical shape. The protruding part 58 also has a frustoconical shape, conjugated with that of the lower axial sleeve end. These frustoconical shapes have an axis combined with the axis X of the sleeve.

Advantageously, each guide tube 12 comprises a tubular guide structure 62 and an end part 64 fastened to the guide structure 62 and defining the upper axial guide tube end 54.

The tubular guide structure 62 typically includes at least the guide slots and the cover 20. It typically also includes an upper plate 66, closing an upper end of the cover 20. The upper plate 66 is typically oriented perpendicular to the central axis. It has a passage opening 68 (FIG. 4), passed through by the rod 50.

The end part 64 includes a base plate 70, having lower 72 and upper 74 large faces. The lower large face 72 bears directly against the upper face 76 of the upper plate 66.

The protruding part 58 protrudes axially toward the sleeve 36 from the upper large face 74.

The base plate 70 is oriented substantially perpendicular to the central axis.

The end part 64 has a central axial opening 78, passed through by the rod 50. The central axial opening 78 and the passage opening 68 are placed to coincide with one another.

The upper plate 66 and the end part 64 have, perpendicular to the central axis, substantially identical inner and/or outer sections.

More specifically, the inner section of the passage opening 68 is substantially identical to the inner section of the central axial opening 78. The outer section of the base plate 70 is substantially identical to the outer section of the upper plate 66.

In the illustrated example, the base plate 70 and the upper plate 66 are circular.

As shown in FIGS. 3 to 6, the end part 64 has fluid circulation ducts emerging in the central axial orifice 78. The ducts 80 extend radially from the edge 82 of the base plate 70 into the central axial opening 78. The ducts 86 extend radially from the edge 61 of the base plate 58 into the central axial opening 78.

Figure 6:
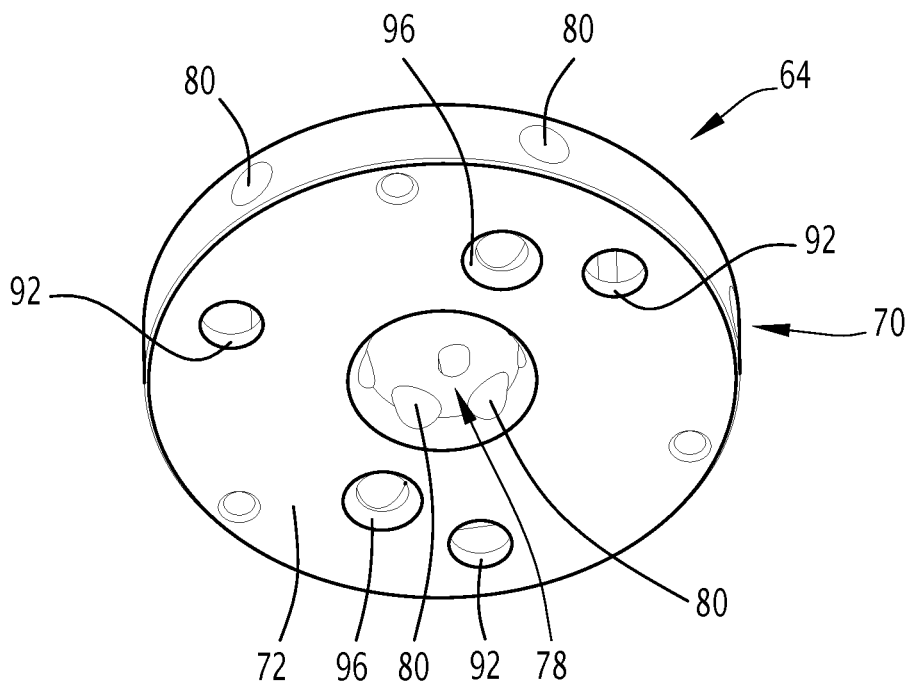
Figure 7:
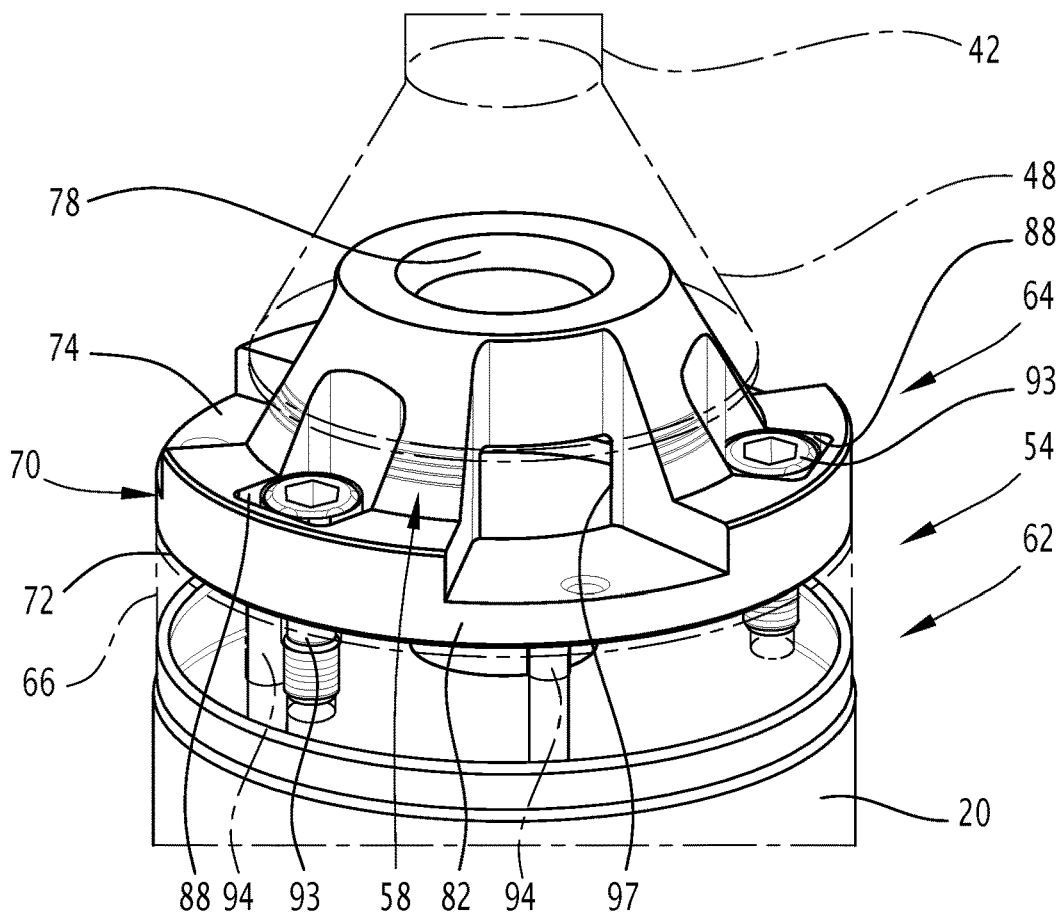
FIGS. 7 and 8 illustrate an embodiment variant of the end part.

The end part 64 further includes three hollow reliefs 88 (FIG. 5) that are provided to house screws for fastening the end part 64 to the upper plate 66. These three hollow reliefs 88 are, in the illustrated example, arranged partially in the base plate 64 and partially in the protruding part 58. The bottoms 90 of the hollow reliefs 88 are pierced by openings 92, visible in FIG. 6, provided for the passage of the fastening screws 93 (FIG. 7). The heads of the fastening screws are housed in the hollow reliefs.

In a variant, the end part 64 is not fastened to the guide structure 62 by screws, but by any other suitable means, for example by welds.

As visible in FIG. 4, the guide tube 12 includes anti-rotation bars 94, protruding relative to the upper face 76 of the upper plate 66. The end part 64 has, on its large lower face 72, housings 96 for receiving protruding parts of these bars.

Figure 8:
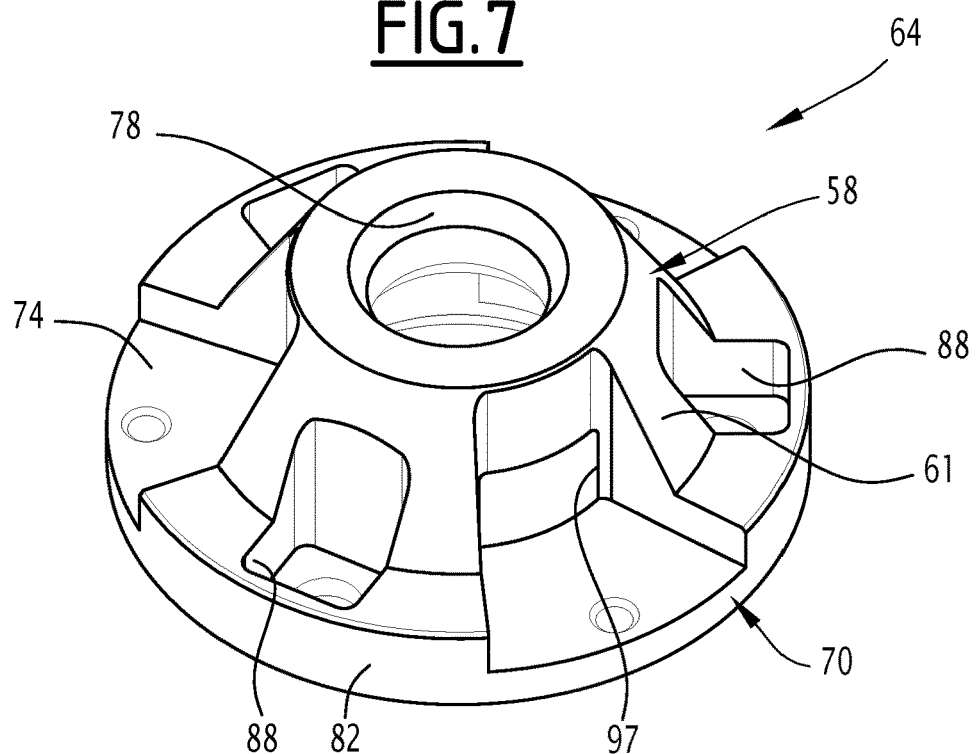

According to an embodiment variant shown in FIGS. 7 and 8, the circulation ducts 80, 86 are replaced by large openings 97. These openings 97 are hollowed out in the protruding part 58, and more specifically in the outer surface 61. They emerge in the central axial opening 78. They have a closed contour.

The openings 97 are typically distributed circumferentially around the protruding part 58, between the hollow reliefs 88.

Figure 9:
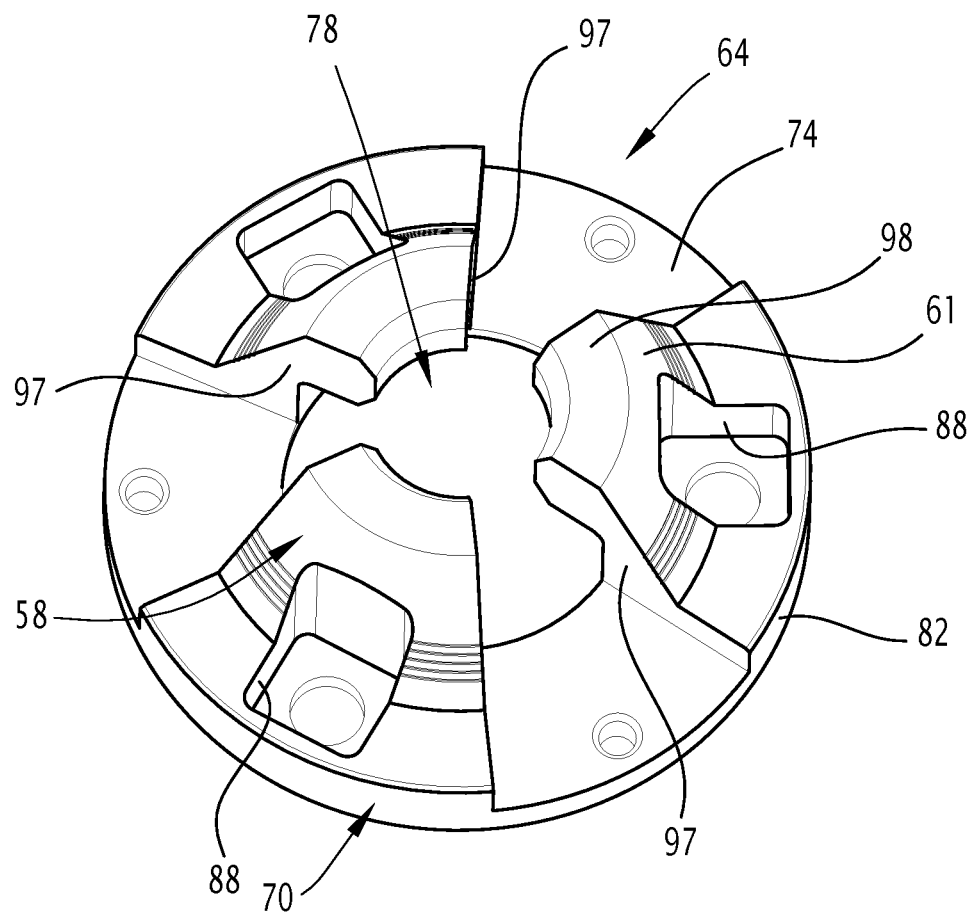
FIG. 9 illustrates another embodiment variant of the end part.

According to the embodiment variant shown in FIG. 9, the openings 97 do not have a closed contour.

The protruding part 58 is laterally delimited, toward the inner surface 60 of the lower axial end 48, by the outer surface 61, and axially by an annular surface 98. The annular surface 98 is perpendicular to the axis X and faces upward.

The openings 97 each emerge at the annular surface 98, dividing the latter into three annular segments that are completely separated from one another.

Figure 10:
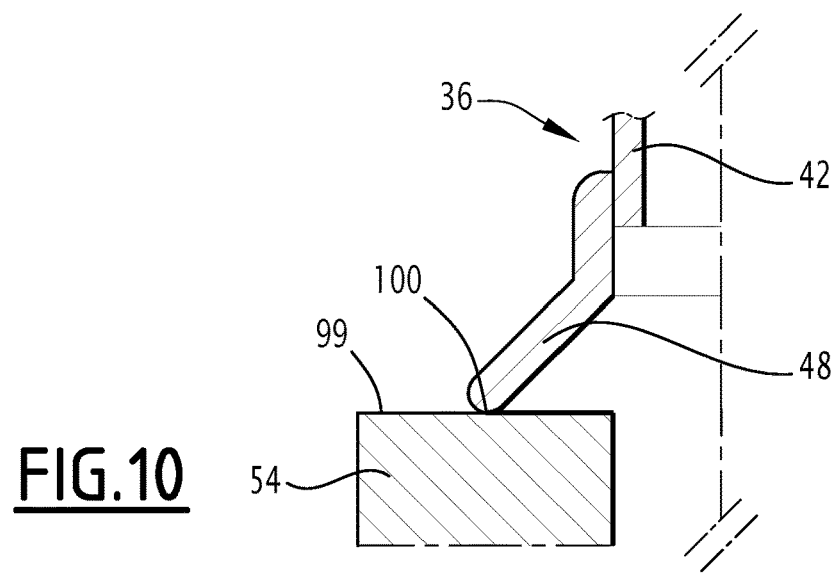
FIGS. 10 to 12 illustrate different variants of the present disclosure, corresponding to different forms of the upper axial end of the guide tube.
Figure 11:
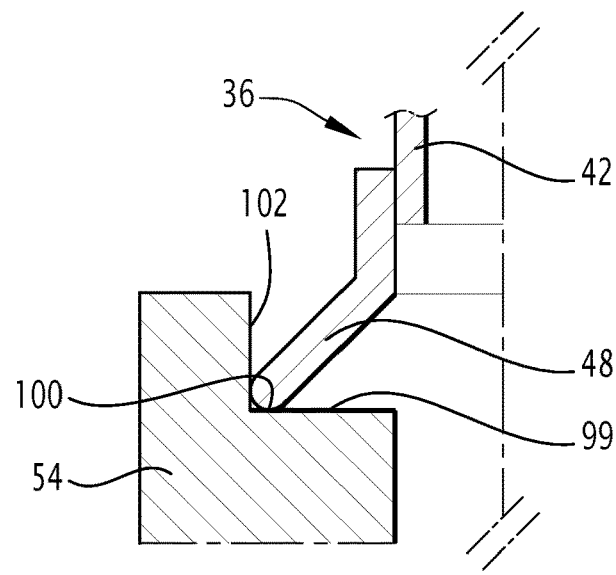
Figure 12:
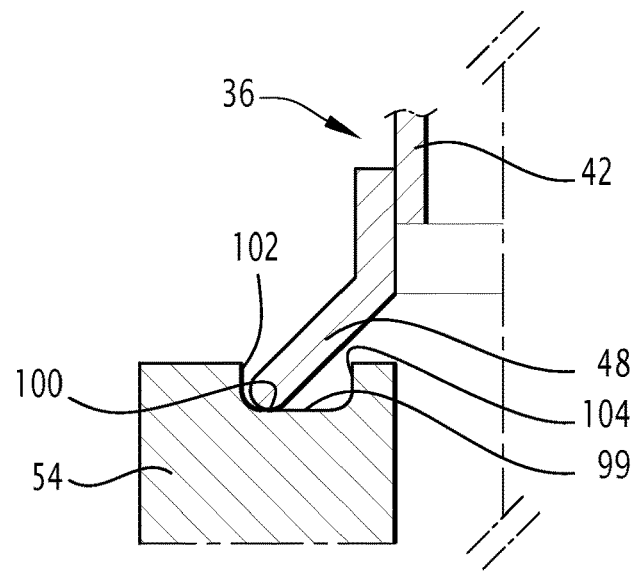

According to embodiment variants shown in FIGS. 10 to 12, the upper axial guide tube end 54 has a lower step 99, a free edge 100 of the lower axial sleeve end 48 being located axially above the lower step 99.

The axial gap 56 in this case is defined between the free edge 100 and the lower step 99.

The lower step 99 is for example defined by a plurality of closed-contour surfaces, separated from one another by passages, and distributed around the rod 50.

These closed-contour surfaces are for example defined by studs, protruding axially. The lower step 99 typically fits into a surface perpendicular to the central axis. The passages separating the different closed-contour surfaces allow the circulation of the primary fluid filling the vessel.

In this case, the lower step 99 is for example arranged on an end part attached on the guide structure. This end part includes a plate bearing the studs.

In a variant, the lower step is a continuous surface, surrounding the rod 50.

Advantageously, the upper axial guide tube end 54 includes at least one radial stop 102, 104 located radially toward the inside and/or toward the outside of the lower step 99, as illustrated in FIGS. 10 and 11. The radial gap is defined between the free edge 100 and the outer 102 or inner 104 radial stop.

Typically, the stops 102, 104 are formed on the end part defining the lower step 99.

In the example shown in FIGS. 10 to 12, the lower axial end of the sleeve 48 has a flared shape.

In the embodiment of FIGS. 3 to 6, the lower axial sleeve end 48 may not have a frustoconical shape with circular sections perpendicular to the central axis. These sections can be oval, or have any other shape.

According to an embodiment variant, the upper axial end of the guide tube 54 is defined by the tubular guide structure, and not by an end part fastened to the guide structure.

According to a second aspect, the present disclosure targets a method for maintaining a nuclear reactor, comprising:
  a vessel 1 having a substantially vertical central axis, the vessel 1 including a vessel head 2 having a plurality of openings 2a;
  a core 4, positioned inside the vessel 1;
  guide tubes 12, positioned inside the vessel 1, each guide tube 12 comprising a tubular guide structure 62;
  a plurality of members controlling the reactivity of the core 14, axially movable inside the guide tubes 12;
  vessel head penetrations 22, each comprising a tubular adapter 24 fixed in one of the openings 2a and defining an inner passage 34, each vessel head penetration 22 further comprising a tubular sleeve 36 engaged in the inner passage 34 and axially extending in line with one of the guide tubes 12;
  control rods 50, secured to control members 14 and each extending through one of the sleeves 36;
  drive mechanisms 52 of the control members 14, located outside the vessel 1, each mechanism 52 being configured to drive one of the rods axially 50.

Each sleeve 36 is suspended by an upper axial sleeve end 38, resting on an upper step 40 arranged on the corresponding adapter 34.

A lower axial end 48 of the sleeve projects axially into the vessel 1 beyond the penetration 22, and is located above the corresponding guide tube 12.

The method comprises at least the following step:
  fastening an end part 64 to the guide structure 62 of at least one guide tube 12, the end part 64 defining an upper axial guide tube end 54, the lower axial sleeve end 48 being separated from the corresponding upper axial guide tube end 54 by an axial gap 56 with a height smaller than 50 millimeters.

Advantageously, the lower axial sleeve end 48 is separated from the corresponding upper axial guide tube end 54 by a radial gap with a width smaller than 20 millimeters.

The end part is advantageously of the type described above.

After the step for fastening the end part 64 to the guide structure 62, the nuclear reactor is of the type described above.

The maintenance method is typically carried out on reactors that are already in use. It can be implemented preventively, before significant wear of the sleeve or the adapter. It can be implemented preventively, before significant wear of the sleeve or the adapter.

The maintenance method typically comprises the following steps, carried out before the step for fastening the end part to the guide structure:
  disassembling the vessel head 2 and removing it;
  disassembling the upper internal equipment of the nuclear reactor, including the guide tubes 12, and transfer into a pool of the nuclear reactor.

The operation for fastening the end part 64 is preferably done with the guide tubes 12 submerged in the pool of the reactor.

The fastening step typically comprises the following sub-steps:
  producing tappings in the upper plate 66 of the guide structure 62, these tappings being provided to receive the fastening screws for fastening the end part 64 to the guide structure 62;
  placing a centering plug in the passage opening 68 of the upper plate 66;
  placing the end part 64 on the guide structure 62;
  screwing fastening screws on the end part 64 in the tappings previously made;
  removing the centering plug.

The centering plug serves as a guide during the sub-step for placement of the end part on the guide structure, and prevents objects from falling into the guide tubes 12. The central axial opening 78 is slipped around the centering plug.

After the step for fastening the end part 64 to the guide structure 62, the maintenance method comprises the following steps:
  transferring the upper inner equipment from the reactor to the pool in the vessel 1, including the guide tubes 12 now incorporating the end parts 64;
  replacing the vessel head 2 and closing the vessel 1.

Thus, the present disclosure makes it possible to stabilize the sleeve 36 at a given altimetry, by means of the end part 64 fastened on the guide structure 62. The sleeve 36 retains all of its functions:
  hydraulic valve;
  thermal protection of the adapter 24;
  guiding and protection of the control rod 50.

The sleeve 36 has a hydraulic valve function in the sense that the sleeve 36 lifts off of the upper step 40 in order to allow fluid to circulate from the inside of the vessel 1 toward the inside of the mechanisms 52 in case of rapid lowering of the control members 14 from the reactivity of the core.

The placement of the end part 64 makes it possible to stop the wear of the sleeve 36 and the adapter 24, because the sleeve 36 is held at both of its ends, which limits its travel.

The placement of the end part 64 has no impact on safety. It has little or no impact on the other maintenance operations provided on the guide tubes 12, and requires only an adaptation of the grab making it possible to grasp and handle the guide tubes 12.

The installation time of the end parts 64 is not critical for the unit outage, this operation being able to be done during hidden time relative to the other work on the vessel head.

The end parts 64 are inexpensive, and relatively simple to place. The fastening of the end part 64 on the structure 62 typically requires only tapping operations.

What is claimed is:

1. A nuclear reactor comprising:
    a vessel having a vertical central axis, the vessel including a vessel head having a plurality of openings;
    a core positioned inside the vessel;
    guide tubes positioned inside the vessel;
    a plurality of control members for controlling the reactivity of the core, axially movable inside the guide tubes;
    vessel head penetrations each comprising a tubular adapter fixed in one of the openings and defining an inner passage, each vessel head penetration further comprising a tubular sleeve engaged in the inner passage and axially extending in line with a corresponding one of the guide tubes;
    control rods secured to the control members and each extending through one of the tubular sleeves; and
    drive mechanisms of the control members, located outside the vessel, each drive mechanism being configured to drive one of the control rods axially,
    each tubular sleeve being suspended by an upper axial end resting on an upper step arranged on the corresponding tubular adapter,
    a lower axial end of the tubular sleeve projecting axially into the vessel beyond the tubular adapter and being separated from an upper axial end of the corresponding guide tube by an axial gap having an axial height of less than 50 millimeters,
    wherein the upper step is outside of the vessel.

2. The nuclear reactor according to claim 1, wherein the lower axial end of the tubular sleeve is separated from the upper axial end of the corresponding guide tube by a radial gap with a radial width smaller than 20 millimeters.

3. The nuclear reactor according to claim 1, wherein the lower axial end of the tubular sleeve has a shape flared toward the corresponding guide tube, the upper axial end of each of the guide tubes comprising an axially protruding part engaged in the corresponding lower axial end of the tubular sleeve, the axial gap being defined between an inner surface of the lower axial end of the tubular sleeve and the axially protruding part of the corresponding guide tube.

4. The nuclear reactor according to claim 3, wherein the lower axial end of the tubular sleeve is separated from the corresponding upper axial end of the guide tube by a radial gap with a radial width smaller than 20 millimeters, the radial gap being defined between the inner surface of the lower end of the tubular sleeve and the axially protruding part.

5. The nuclear reactor according to claim 3, wherein the lower axial end of the tubular sleeve has a frustoconical shape, the axially protruding part having a frustoconical shape conjugated with that of the lower axial end of the tubular sleeve.

6. The nuclear reactor according to claim 1, wherein the upper axial end of the guide tube has a lower step, a free edge of the lower axial end of the tubular sleeve being located axially above the lower step, the axial gap being defined between the free edge and the lower step.

7. The nuclear reactor according to claim 6, wherein the lower step is defined by a plurality of closed-contour surfaces, separated from one another by passages, and distributed around the control rod.

8. The nuclear reactor according to claim 6, wherein the lower axial end of the tubular sleeve is separated from the upper axial end of the corresponding guide tube by a radial gap with a radial width smaller than 20 millimeters, the upper axial end of the guide tube including at least one radial stop located radially toward an inside and/or toward an outside of the lower step, the radial gap being defined between the free edge and the at least one radial stop.

9. The nuclear reactor according to claim 1, wherein each guide tube comprises a tubular guide structure and an end part fastened to the guide structure and defining the upper axial end of the guide tube.

10. The nuclear reactor according to claim 9, wherein the end part has a central axial orifice passed through by the control rod, and fluid circulation ducts emerging in the central axial orifice.

11. The nuclear reactor according to claim 10, wherein the tubular guide structure comprises an upper plate having a passage orifice for the control rod placed to coincide with the central axial orifice, the end part being fastened to the upper plate, the upper plate and the end orifice having, perpendicular to the vertical central axis, inner and/or outer sections that are identical.

12. A method for maintaining the nuclear reactor as recited in claim 1,
    each guide tube comprising a tubular guide structure;
    the method comprising:
        fastening an end part to the guide structure of at least one guide tube, the end part defining the upper axial end of the guide tube, the lower axial end of the tubular sleeve being separated from the upper axial end of the corresponding guide tube by the axial gap with the axial height smaller than 50 millimeters.

13. The method according to claim 12, wherein the lower axial end of the tubular sleeve is separated from the upper axial end of the corresponding guide tube by a radial gap with a radial width smaller than 20 millimeters.

* * * * *